United States Patent
Prahl

[11] 3,851,337
[45] Dec. 3, 1974

[54] UNIVERSALLY MOVABLE ANKLE JOINT FOR TUBE SKELETON ARTIFICIAL LIMBS

[75] Inventor: Klaus Prahl, Luneburg, Germany

[73] Assignee: IPOS Gesellschaft fur integrierte Prothesen-Entwicklung und orthopadietechnischen Service m.b.H & Co., KG, Luneberg, Germany

[22] Filed: July 20, 1973

[21] Appl. No.: 381,226

[30] Foreign Application Priority Data
Aug. 1, 1972 Germany.............................. 2237758

[52] U.S. Cl. .................................................... 3/32
[51] Int. Cl.......................A61f 1/04, A61f 1/08
[58] Field of Search ....................... 3/30–35, 26–29, 3/6, 7, 2; 287/96, 91, DIG. 10

[56] References Cited
UNITED STATES PATENTS

| 1,102,774 | 7/1914 | Martinchek | 3/34 |
| 1,572,319 | 2/1926 | Scully | 3/32 |
| 2,446,042 | 7/1948 | Valenti | 3/6 |
| 2,853,712 | 9/1958 | Bach | 3/32 X |
| 3,551,914 | 1/1971 | Woodall | 3/6 |

FOREIGN PATENTS OR APPLICATIONS
578,707  7/1958  Italy........................................ 3/31

*Primary Examiner*—Richard A. Gaudet
*Assistant Examiner*—Ronald L. Frinks
*Attorney, Agent, or Firm*—Toren, McGeady and Stanger

[57] ABSTRACT

The invention relates to an ankle joint for tube skeleton artificial limbs in which the joint movements are no longer exclusively controlled by buffer elements but in such a manner that brake units or hydraulic damping units absorb a part of the kinetic energy liberated during the movements.

3 Claims, 2 Drawing Figures

PATENTED DEC 3 1974

3,851,337

UNIVERSALLY MOVABLE ANKLE JOINT FOR TUBE SKELETON ARTIFICIAL LIMBS

SUMMARY OF THE INVENTION

A large number of ankle joints for artifical wooden legs have been known for a long time, such as for example resilient-articulate foot connections (Offenlegungsschrift 1,491,237), rubber block joints (German utility model 6,916,492), feet with cushioned universal joints (Offenlegungsschrift 1,932,569) and feet with hydraulic control units (Offenlegungsschrift 2,101,303) and other unprotected joints.

The trend in the artificial limb art today is away from the still widely used artificial wooden limbs to tube skeleton artificial limbs. The outer form of such tube skeleton artificial limbs is made from foam material. To apply this new technique satisfactorily the ankle joints must be made smaller than hitherto to ensure sufficient foam lining of the joints. Further, additional requirements are to be taken into account in the design for greater freedom of movement. The joint unit is to combine adequate movement of the sole of the foot with a resilient movement of the back of the foot as well as an internal and external tilting with rotation about the longitudinal axis of the artificial limb.

In addition to the requirements for smaller dimensions and greater more varied freedom of movement there is a further requirement arising from the function: The joint movements are no longer to be controlled exclusively by buffer elements but in such a manner that brake units or hydraulic damping units absorb a part of the kinetic energy liberated during the movements.

The invention is based on the problem of providing for tube skeleton artificial limbs a novel ankle joint which meets the aforementioned requirements.

An axle is screwed into the front portion of a support element. The axle may be keyed by a wedge so that a commercially available joint bearing may be clamped on the axle. An eye bolt is pressed onto the joint bearing in the direction of the longitudinal axis of the artificial limb. The articulate joint made up in this manner can execute all the movements required of the foot. The movements are limited in their angle of movement in accordance with the knowledge of orthopedic techniques in the following manner: To limit the internal-external tilting of the foot and the rotation about the longitudinal axis of the artificial limb two elastic discs are provided on the axle between the eye bolt and the support element. A second joint bearing is pressed from above onto the eye bolt extending in the direction of the longitudinal axis of the artificial limb, the main plane of movement of said second bearing being transverse to the longitudinal axis of the artificial limb. This joint bearing is connected via press fit to a second eye bolt which extends transversely of the longitudinal axis of the limb and which is articulately guided in the support element and is screwed at its free end to a bulb-like closure plate. The closure plate is provided at the front and back with different buffer elements and thus limits the movements of the sole and back of the foot. The eye bolt extending in the direction of the longitudinal axis of the prosthesis corresponds in its outer form of the eye portion to a sphere flattened on both sides. A brake element biased with a spring presses from the rear on said sphere and thus produces a frictional engagement which is effective during all movements.

DETAILED DESCRIPTION OF THE DRAWING

Figure 1:
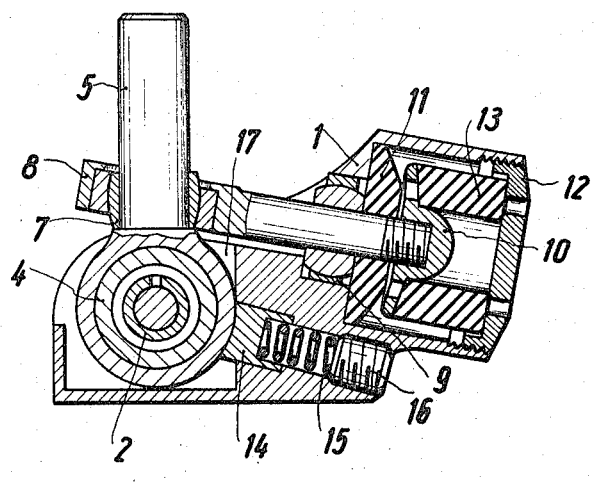
FIG. 1 shows the joint in center section and FIG. 2 in section along the joint axis.
Figure 2:
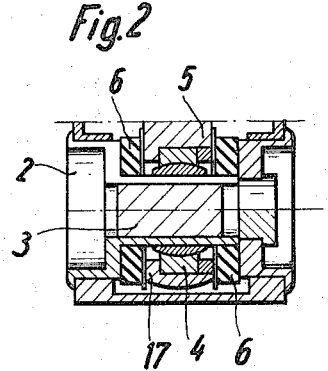

An axle 2 is screwed into a support element 1. The axle 2 may be wedged by a cone 3. The wedging action fixes a joint first bearing 4 on the axle 2. The bearing 4 is firmly connected to a first eye bolt 5 via a press fit. The first eye bolt 5 is supported with respect to the support element 1 with two resilient or elastic discs 6. A second bearing 7 is pressed onto the first eye bolt 5. A second eye bolt 8 is pressed onto the second bearing 7. The second eye bolt 8 is guided in the support element 1 in a third bearing 9. A closure plate 10 is screwed onto the rear end of the second eye bolt 8. In front of the closure plate 10 there is a first buffer element 11. Between the closure plate 10 and the support element cover 12 there is a second buffer element 13. A brake element 14 is biased with the spring 15 of the screw 16 and presses against the spherical portion 17 of the first eye bolt 5.

With the ankle joint described for artificial legs all movements required of such a prosthesis can be carried out. All the movement limitations may be fixed independently of each other. All the movements are controlled by a brake element.

I claim:

1. Universally movable ankle joint for tube skeleton artificial limbs comprising a support element, an axle screwed into engagement with said support element, said axle having a first axis, a first joint bearing fixed on said axle within said support element and extending around the first axis thereof, a first eye bolt press fitted about the outer periphery of said joint bearing and said first eye bolt extending outwardly from said axle with the axis of the outwardly extending portion thereof extending transversely of the first axis of said axle, a second joint bearing press fitted onto said eye bolt at a position spaced outwardly from said axle and extending around the axis of the outwardly extending portion of said first eye bolt, a second eye bolt pressed onto the outer periphery of said second joint bearing and said second eye bolt having a shank extending from said second joint bearing with the axis of said shank extending transversely of the axis of said first eye bolt, a third bearing extending around the shank of said second eye bolt at a position spaced along said shank outwardly from said first eye bolt, said third bearing supported in said support element, a closure plate fitted on the end of said shank spaced more remotely from said first eye bolt and located within said support element, a first resilient buffer element positioned in said support element encircling said shank and positioned between and in contact with said third bearing and said closure plate, and a second resilient buffer element mounted in said support element and disposed in contact with the opposite surface of said closure plate from said first buffer element, and said closure plate controlling movement limitation.

2. Universally movable ankle joint, as set forth in claim 1, wherein a pair of resilient discs are mounted on said axle extending around the first axis thereof and each of said discs is positioned on an opposite side of said first eye bolt from the other and each said disc being in contact on one surface with said first eye bolt and on the opposite surface with said support element.

3. Universally movable ankle joint, as set forth in claim 1, wherein the end of said first eye bolt secured to said axle has a spherical face spaced radially outwardly from said first joint bearing and said spherical face located in said support element, a brake element mounted in said support element and disposed in contact with the surface of said spherical face, a spring mounted in said support element and disposed in contact with the opposite surface of said brake element from the surface thereof contacting said spherical face, and a screw mounted in said support element in contact with the opposite end of said spring from said brake element, and said spring and screw arranged to bias said brake element against said spherical face.

* * * * *